April 17, 1956   J. D. MAHAND   2,741,929
PINION HUB
Filed March 9, 1953
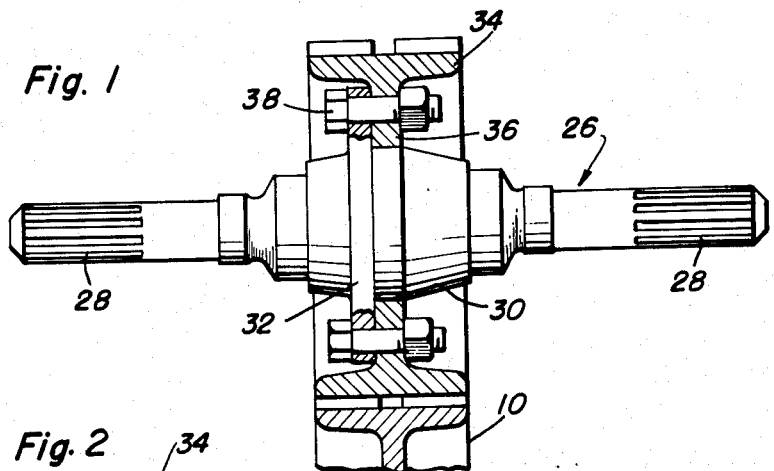
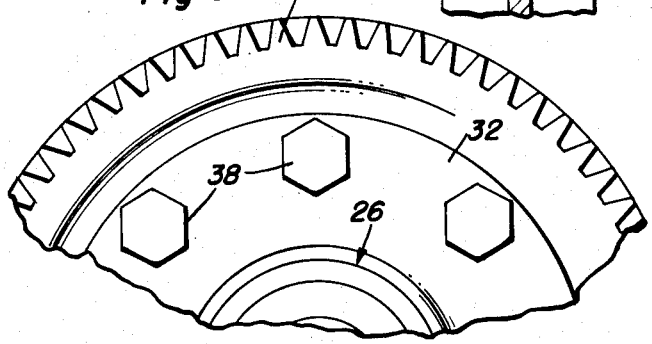
Jack D. Mahand
INVENTOR.

United States Patent Office 2,741,929
Patented Apr. 17, 1956

2,741,929

PINION HUB

Jack D. Mahand, Odessa, Tex.

Application March 9, 1953, Serial No. 341,228

1 Claim. (Cl. 74—431)

This invention relates in general to driving shafts for engines, and more specifically to an improved pinion hub for connecting opposed engines to a driven gear.

The primary object of this invention is to provide an improved pinion hub for use in drivingly connecting opposed engines to a driven gear, said pinion hub being elongated and having splined opposite ends adapted to be removably engaged with said opposed engines, said pinion hub having removably connected thereto a pinion gear for engaging said driven gear.

Another object of this invention is to provide an improved pinon gear and hub for connecting opposed engines to a driven gear, said pinion gear and hub being intended as a replacement unit which may be utilized without modification of either of the opposed engines or the driven gear.

A further object of this invention is to provide an improved pinion gear and hub which is intended as a replacement unit for a pinion gear and a pair of splined shafts, the replacement unit being of a much sturdier construction than the original unit and reducing wear to a minimum.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is a fragmentary vertical sectional view showing a replacement pinion gear and hub; and Figure 2 is a fragmentary side elevational view showing the connection between the pinion hub and the pinion gear.

There is now on the market a quad unit which consists of two pairs of opposed engines with each pair of opposed engines being disposed on opposite sides of a centrally located bull gear and connected to the same in driving relation by a pinion gear. The pinion gear of each pair engines is connected to the individual engines of the pair by suitable drive shafts.

Referring now to Figure 1 in particular, it will be seen that there is illustrated a replacement unit for pinion gear and drive shafts for driving the bull gear. The replacement unit includes an elongated pinion hub which is referred to in general by the reference numeral 26. The pinion hub 26 is provided with splined ends 28 which are adapted to engage the splined hubs of clutch disks of opposed engines (not shown). The central portion of the pinion hub 26 is enlarged as at 30 and includes an enlarged annular ring 32 which is displaced to one side of the center of the pinion hub 26.

Carried by the pinion hub 26 for rotation therewith is a pinion gear 34 which is intermeshed with the bull gear 10. The pinion gear 34 has an annular web 36 which is seated on the enlarged central portion 30 of the pinion hub 26 and which abuts the ring 32. The annular web 36 is secured to the ring 32 by a plurality of circumferentially spaced fasteners 38 so as to facilitate removal of the pinion gear 34 from the pinion hub 26.

Inasmuch as the pinion hub 26 is now rigidly connected to the pinion gear 34, and since the splined ends 28 are connected with clutch disks (not shown) which are free to slip upon overloading or a sudden surge of power, it will be seen that the twisting action of the splined ends 28 relative to each other and the pinion gear 34 will be taken up by the pinion hub 26 and there will be no wearing out of the connections between drive shafts and a pinion gear as in the case of the unit now in use. Also, in the event that for some unforeseen reason the splined ends 28 of the pinion hub should be worn, the pinion hub 26 may be replaced individually of the pinion gear 34 which would not have any worn connections so that the replacement of a worn unit would be relatively inexpensive as compared to the replacement of a worn unit of the type now in use.

From the foregoing, the construction and operation of the device will be readily understood and further explanation is believed to unnecessary. However, since numerous modifications and changes will readily occur to those skilled in the art, it is not desired to limit the invention to the exact construction shown and described, and accordingly all suitable modifications and equivalents may be resorted to, falling within the scope of the appended claim.

What is claimed as new is as follows:

A driving connection for use between a pair of opposed engines and a driven gear comprising a single pinion hub having splined opposite ends adapted for removable engagement with a pair of opposed engines, said pinion being provided with an integral, centrally located enlarged annular portion, said enlarged portion being provided with an annular bearing surface disposed parallel to the axis of the hub, said bearing surface being positioned midway of the length of said hub, a radially extending flange integral with said enlarged annular portion and positioned at one side of said bearing surface, a drive gear removably secured to said pinion hub, said drive gear comprising an elongated annular ring having a plurality of teeth disposed on the outer periphery thereof, an integral radially inwardly extending flange on said ring, said flange being positioned midway of the length of said ring, said flange having a central opening therein receiving the bearing surface on said enlarged annular portion, said flange on said ring abutting the flange on said hub whereby said gear is positioned centrally of said hub, and fasteners extending through said abutting flanges for securing said gear in position on said pinion hub.

References Cited in the file of this patent

FOREIGN PATENTS 396,840   France ---------------- Apr. 21, 1909